July 20, 1965 W. J. RICHARDSON 3,196,318
HIGH DENSITY ELECTRONIC PACKAGE
Filed June 6, 1960
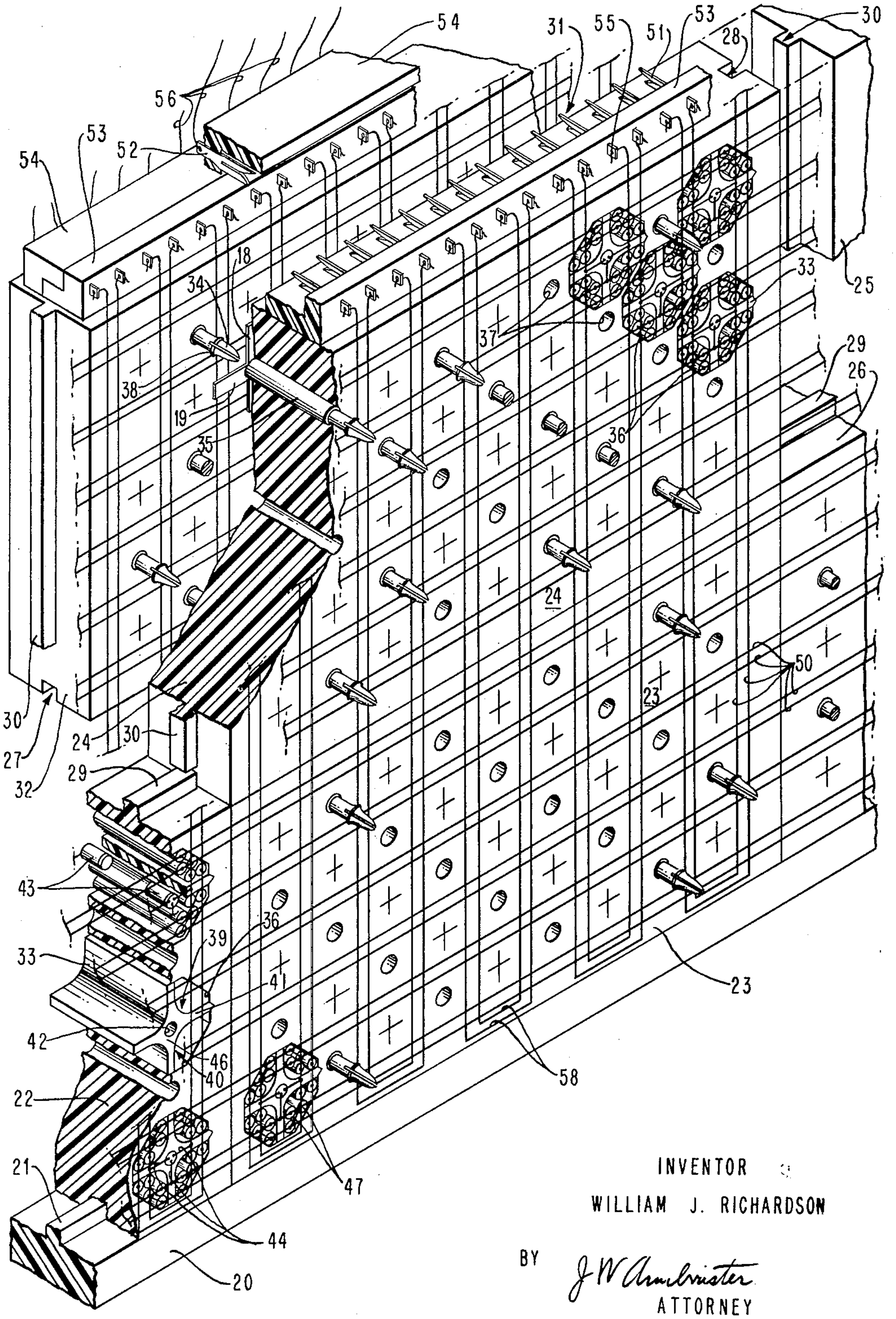
INVENTOR
WILLIAM J. RICHARDSON
BY J W Armbruster
ATTORNEY

United States Patent Office

3,196,318

Patented July 20, 1965

3,196,318

HIGH DENSITY ELECTRONIC PACKAGE

William J. Richardson, Poughkeepsie, N.Y., assignor to International Business Machines Corporation, New York, N.Y., a corporation of New York Filed June 6, 1960, Ser. No. 34,001
10 Claims. (Cl. 317—101)

The present invention is concerned in general with electronic assemblies and more particularly to a novel method and means of producing such assemblies and packaging the elements thereof so that they occupy a minimum of space consistent with accessibility and replacement of standard components.

In order to assemble high speed electronic systems within limited space, there has evolved the need for increasing emphasis on miniaturization. However, in the use of small parts under crowded conditions, other difficulties are generally produced in electronic assemblies and such difficulties of lack of reliability, poor heat conduction and lack of accessibility usually mount as the size of units is reduced. Therefore, an object of the present invention is to provide high density packaging of electronic equipment in which the usual difficulties are reduced while at the same time providing assemblies which afford reduction in size and weight and are easily automated and capable of withstanding vibration, shock and sudden impact.

The present invention involves a construction wherein the components are assembled or composed of keyed units. The larger keyed units are blocks of rectangular insulation of a plastic or ceramic nature formed with keyed tongue and groove borders and interior apertures which in turn are receptive of small uniformly shaped modules or component holders each formed as a sort of "windmill" shape or spoked hub. These so called windmills are in the shape of a hollow hub with four radiating flat bladed spokes, with four outer recesses and one central cylindrical hole. The windmill blades are shaped to fit snugly into octagonal apertures in the plastic blocks and there is a plurality of such octagonal openings in a regularly spaced array in each rectangular block to receive a number of such complete smaller windmill assemblies, each carrying from one to a score or more of standard sub-miniature electronic components such as resistances, diodes, capacitors, inductances, transistors, cores, etc. These very small electronic components are fixed to the windmill and occupy the space between the spokes, and when assembled occupy the space between the windmill and the eight straight walls of the octagonal aperture. One or more of such components, usually of a cylindrical form, with leads extending from ends are to be placed lengthwise axially along the length of the windmill and in each of its outer recesses. At one or both of the ends of the central hole of the windmill there may be placed a component or a transistor with its leads extending outwardly. On the windmill surfaces, whole areas for lines on such areas are to be made conductive by metallizing with any mechanical, chemical, or electrolytic printed circuit process.

Onto the large insulation blocks there may be formed interconnecting conductive lines by any of the well known printed circuit processes. The same sort of conductor patterns may be formed on any part of the windmill unit usually on the two ends which are the outer surfaces when it is assembled in the plastic block holder. In addition to the printed wiring there is fastened to the plastic block or molded thereon, a series of flexible plug and socket connectors or snap fasteners for binding together rows of blocks nad making circuit connectors between adjacent blocks by plug and socket arrangements. In addition to the interior socket connectors there are exterior terminal members embedded or fastened in a regularly spaced array along one or more of the marginal edges of the plastic blocks.

In order to conductively connect any of the many components mounted on the windmill arrays distributed over the array of the blocks to the outer terminals, there is placed a wire mesh against the outer surfaces of the blocks and this wire mesh comprises at least four vertical and four horizontal wires for each windmill area whereon the extending leads of the components in the windmill may be welded or soldered to the wire mesh and the wires of the mesh in turn are connected to the terminals at the edges. Wherever the wire mesh makes undesirable connections, the mesh is to be severed or eliminated and thus provide a selective wiring pattern on the outside of each unit making it readily universal for many circuit requirements. The wire mesh is to be insulated by varnish or other insulation plastic coatings which may be present either before the welding or soldering operations or applied as a spray or otherwise after the soldering connections are made, or at both times. The wire mesh is readily cut and replaced for testing, elimination, or replacement of modules in a novel fashion.

From the foregoing, it is apparent that a large assembly of a plurality of plastic blocks is readily made accessible down to the smallest component by first disconnecting block row unit sockets and then sliding apart the separate blocks in the tongue and groove connections between blocks before inspecting the wire mesh connections of an individual windmill and, finally, each individual windmill may be removed and replaced so that any defective component on a particular windmill may be checked and replaced outside the mesh while a replacement unit is immediately effective to continue operation of the machine while testing of the removed unit takes place.

A primary object of the present invention is to provide an improved method of assembly for electronic components which overcomes the disadvantages of prior art methods.

Heretofore, the approach has involved merely the closely packed use of standard components and printed circuits and these two items have contributed somewhat to space saving and automatic assembly, for example: In the method of the use of a printed board whereon the components lie parallel to and against one side with their leads bent at right angles and extending through the board for connection with printed wiring on the opposite side of the board. In such construction the component leads require long right angle bends thereby increasing the probability of damage and complicating the methods involved in mechanical assembly. Furthermore, the old arrangement restricted the complexity of the circuits because of the limitations of available board service area for wiring and placement of components. To overcome such disadvantages, components have been assembled in several layers or sandwiches with the leads grouped in complicated arrangements either through more than one plate or connected together so that removal becomes difficult.

Therefore, it is an object of the present invention to provide a relatively simple and easy method of assembling electrical components utilizing unitary construction of a replaceable module or "windmill."

Another object of the present invention is to provide a method of assembly for electronic components which is particularly adapted to the use of printed circuit techniques in combination with removable unit construction.

A further object of the present invention is to provide a method of assembling electronic components in combination with both printed circuit connections and wire mesh connections, the latter being selectively cut to suit particular uses while retaining an over-all universal form of standard arrangement.

The foregoing and other objects, features and advantages of the invention will be apparent from the following more particular description of a preferred embodiment of the invention, as illustrated in the accompanying drawing.

In the drawing:

The figure is a perspective view partly in section showing a number of plastic blocks in a three dimensional array, said blocks containing the subassembly windmill holders connected in a unitary fashion by wire mesh leading to terminal connectors.

In the drawing it is seen that a base strip 20 is formed with a top key rib 21 which fits into a groove 27 formed at the bottom of all basic rectangular blocks such as the block portion 22 shown at the left. Such strips and blocks are of insulation of plastic form and may be any of the thermoplastic or thermosetting materials, or of glass or any suitable ceramic material. In the foremost row of component holder blocks, there are two central blocks 23 and 24 (the latter on top of the former) and three block portions 22, 25, and 26 associated with the sides of the central pair. All five blocks are similar in shape and size, with grooves 27 and 28 in the bottom and right sides, respectively, and ribs 29 and 30 on the top and left sides respectively. Because of such ribbed construction it is apparent that such a double row and continuous lines of blocks are not only accurately spaced and coordinated, but also extremely rigid, integral and resistant to dismemberment by vibration, shock, or impact.

Behind the foremost lines of blocks 23, 24, etc., is a second line of blocks, only one of which, block 32, is shown as representative of a whole array. It is obvious that the arrays as shown may be repeated in three dimensions to any extent desired with the advantages of the use of a single universal type of block such as block 24 which is easy to test, remove and replace if necessary. It is contemplated that such testing, removal and replacement is to be more usual in connection with the smaller unit or windmill holder 33 of which, by way of example, twenty three are assembled in each block.

It is already noted how a double tier of blocks 22, 23, 24, etc., are to be held together laterally with ribs and grooves and some form of end locking clamp or confining structure (not shown). At the upper left end of FIG. 1, longitudinal connectors in the form of plugs 34 and sockets 35 may be noted. Interspersed between the staggered octagonal apertures 36 in each block 24, are smaller cylindrical holes 37, some or all of which contain tubular sockets 35 and a forwardly extending slotted plug tip 34 which is ridged at 38 to preserve a space 31 between longitudinally connected blocks, but fit snugly into the mating socket 35 of an adjacent block 24 to hold the three dimensional array together. Here again, not shown, some form of end confinement or clamp may be used to insure continued proper spacing and adjoinment of all blocks longitudinally as well as laterally. The spaces 31 may be used for circulating cooling gas or liquid coolant or a solid heat conductor and further insulation of granular or continuous form may be incorporated.

Plugs 34 and sockets 35 are also part of the circuit connections. On the end of each socket is secured vertical and horizontal conductor strips 18 and 19 which may join any number of sockets electrically and in turn be connected to any of the cross wires, component leads or connectors.

At the lower left corner of the drawing, FIG. 1, a single windmill 33 is shown without components to illustrate how it fits snugly within the octagonal aperture 36 with four longitudinal spaces such as spaces 39 and 40 provided between the spokes 41. The central opening 42 extends all the way through so that two components such as transistors 43 (in the sectioned holder) may be assembled within the ends with leads 44 (at lower left) extending, and a central space remaining for other components in the same hole. The material of the windmill is essentially non-conductive and hence is of ceramic, glass or any plastic suited to any particular environment known beforehand.

On the surface of the windmill, one or all of the spoke edges or outer surfaces 45 may be made conductive with vacuum metallized copper or sintered copper foil bonded in place during the moulding of the holder. Other conductive surface processes such as chemical metal reduction or foil adhesion may be employed as with any of many well known printed circuit processes. Not only are certain spoke edge surfaces to be made conductive, but one or both windmill end surfaces 46 may be treated in the same fashion. Rather than have entire spoke end and windmill end surfaces coated as ground planes, shields, common bus connectors, etc., it is possible to form thereon one or more conductor lines by any of the screening, masking, and selective etching processes of printed circuits.

In each of the four spaces 39, 40, etc., one or two pairs of resistors or capacitors 47 are to be placed with the end leads of such cylindrical bodies extending beyond both ends of the mill 33 and bent over the surface 46 thereof and there either free of all other mill connections or connected to a metallized surface or line on the mill 33. The windmills 33 may very well be of a standardized length slightly longer than cylindrical components fitted thereon. It is evident that in each space such as space 40 a full complement of components may be packed, or the space left empty for cables, bus bars, structural supports, etc., in an optional fashion.

While it is the main intent that all components within the spaces 39, 40, etc., are to be attached to the related module or windmill 33 and removable therewith, it is obvious that in special cases one or more components could be attached to the basic support block 23 or some wiring thereon and structurally independent of an adjacent mill 33 but electrically coordinated therewith.

Although the leads of components 47 and transistors 43 may extend in a haphazard fashion, it is contemplated that they would be arranged in an orderly manner at four vertical levels and four horizontal positions to agree with the vertical and horizontal placement of lines or wires 50 of a connector mesh or screen which covers either or both faces of all blocks. The mesh is arranged with two pairs of horizontal wires passing across the upper and lower parts of each windmill face surface 46 and two pairs of vertical wires passing across the left and right parts of the same face 46. The central area of face 46 is free of the mesh wires 50 so that any of the transistor leads 44 may be bent out free in any direction to any of the eight wires 50 passing nearby. The leads of the components 47 are bent out in a more orderly fashion as already noted to agree in position with any of the eight related lines 50 and lie under or alongside such lines ready for welding attchment.

A wide choice of attachment or detachment is afforded by the wire mesh 50 because such wires not only go to input or output terminals 51, 52 at the top of the package in strips 53, 54 and to strips 18 and 19, but they also cross the horizontal wires and may be selectively welded thereto and thus connected to end terminals and strips (not shown) similar to 51, 52, 53, and 54. Regarding selective detachment, any of the intermediate sections of wires 50 may be severed, or entire wire strands omitted, to suit particular circuit requirements.

The wire mesh 50 is of an all over pattern and one or more layers of it may be associated with each face of the assembled single layer of blocks 23, 24, etc. The mesh may be self-supporting of plain or insulation coated wire or made up of conductors woven into supporting insulation sheet such as a varnish "Formivar." A printed circuit style of mesh could be employed with conductors in the form of foil lines or chemically or electrically deposited or etched lines on thin insulation sheets. The particular grid pattern is optional with the number and direction of wires arranged to suit particular windmill shapes and component disposition and density.

In the grid or mesh 50 as shown, the related two pairs of vertical wires are connected as at 55 to four grouped stationary slotted terminals 51. The insulation strip 53 of an L shape is more or less stationary and receptive of the mating L shaped strip 54 carrying the outer connector terminals 52 which have attached thereto input or output lines 56 of machine cable connections.

Although connection of the wire mesh 50 as assembled on the rear face of blocks 23, 24, etc., of the drawing is not apparent thereon, it is obvious that it is welded or soldered at appropriate wire and lead intersections to make all necessary circuit connections for the components, and further general input and output connections may be made by wires or bus bars extending through holes 37 and spaces 39, 40 as well as by strips 18 and 19 and connectors 35. Here again, the mesh 50 is to be cut or separated wherever necessary to provide separate circuits. In one form of control, the terminals 51, 52, and the strips 53, 54 are to be duplicated at one end or both ends of the assembled blocks 23, 24, etc., and there connected to the horizontal wires 50 of the mesh on one or both faces of the blocks to be receptive to input and output lines such as line 56. Should both ends have terminals then there is no need for the return U connections as at 58 at the bottom of the drawing, and of course such U formations 58 at base 20 may be eliminated also should terminal strips 53 and 54 be substituted for base strip 20.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electronic module comprising a hollow insulation hub structure with a plurality of radiating rectangular spokes, one or more electronic components mounted inside said hollow hub with the leads thereof extending from said module, and one or more electronic components mounted in each of the spaces between said spokes with the leads thereof extending from said module.

2. The module of claim 1 wherein the outer end surfaces of said insulation structure are coated with electrically conductive material with which certain of the extending leads are brought into contact.

3. An electronic assembly structure comprising a plastic block formed with an octagonal aperture, said aperture containing a snugly fitting insertable module, said module having recesses and openings formed therein and a series of electronic components mounted on said module in said recesses and openings, said components having leads extending from both ends and alongside the outer surfaces of said module, and an exterior uniform overall mesh of wires to which said leads are selectively connected to form circuit connections adapted for coordination with other modules.

4. An electronic packaging assembly comprising a plurality of rectangular insulation blocks formed with keying ribs and keying grooves on complementary edges and suited for connection to similar blocks on all sides, each of said blocks being formed with a pattern of polygonally shaped apertures suited to receive insertable modules, a module shaped to fit snugly within one of said apertures, said module being formed with recesses and openings to receive electronic components having leads extending from both ends of said module, said leads being brought into confinement with the ends of said modules, said modules having metallized and lined end surfaces for forming conductive connections between various leads, and exterior uniform overall wire mesh grids placed adjacent each outer face of said blocks and modules, whereby said wire mesh and extending leads may be welded together selectively, with certain of said mesh wiring being severed to separate the connections into desired circuitry.

5. The electronic packaging assembly set forth in claim 4 wherein one or more borders of said assembled blocks may be provided with a pair of separable insulation terminal strips, pairs of separable terminals on said strip, one of said sets of terminals being connected to the wire of the grids and the other of said sets of terminals being connected to input and output lines of a machine system.

6. The electronic packaging assembly set forth in claim 4 wherein one set of said blocks may be keyed together in a single row with a plurality of tiers, plug and socket connectors on said blocks, and similar sets of blocks brought adjacent the first mentioned row and joined thereto by means of said plug and socket connectors between the two, said plugs and sockets appearing in an interspersed formation among the apertures wherein the component modules are assembled.

7. A method of packaging miniature electronic components in high density arrays comprising the steps of forming recessed windmill holders, metallizing lines and surfaces on said holders, assembling standard miniature components in said recesses with the leads extending to said metallized lines and surfaces, assembling said complete holders in polygonal apertures formed in module style plastic blocks, keying together a series of said blocks, fastening together a plurality of said series of blocks, applying a standard prearranged connecting wire mesh to the outer faces of one or more of said blocks, connecting certain wires of said mesh to said extending leads of said components, severing selected wires of said mesh, connecting the end wires of said mesh to input and output terminals, and coating the outer surfaces of said array with a protective coating.

8. An electronic assembly structure comprising a thin insulation block formed with an inner pattern of honeycomb-like apertures, each of said apertures containing a series of electronic components, said components having leads extending from both ends and outside the surfaces of said insulation block, and an exterior uniform mesh of wires adjacent the outer surfaces of said blocks to which said extending leads are selectively connected to form circuit connections.

9. A method of packaging miniature electronic components in high density arrays comprising the steps of forming component holders of uniform shape, metallizing lines on said holders, assembling miniature components on said holders to complete them with their leads extending outward and to said metallized lines, assembling said complete holders in honeycomb-like apertures formed in module style insulation blocks, keying together a series of said blocks, applying a wire mesh of spacing compatible with said aperture spacing to the outer face of said blocks, and connecting selected wires of said mesh to said outward extending leads of said components.

10. An electronic package basic unit comprising an integral insulation structure of windmill form including a hub and a plurality of rectangular radiating spokes, said spokes being of a length compatible with lengths of standard cylindrical bodied components and slightly shorter, and printed wiring on end surfaces of said spokes, whereby one or more electronic components may be fitted into the space between two adjacent spokes and leads extending from said cylindrical bodies may be bent to coincide with the surfaces at the ends of said spokes.

References Cited by the Examiner

UNITED STATES PATENTS

| | | | |
|---|---|---|---|
| 1,195,778 | 8/16 | Byrne | 317—117 |
| 2,217,510 | 10/40 | Catherwood | 317—116 |
| 2,546,824 | 3/51 | Koliss | 317—99 |
| 2,774,052 | 12/56 | Flour | 317—101 |
| 2,892,131 | 6/59 | MacDonnell | 317—101 |
| 2,898,523 | 8/59 | Charles | 317—99 |
| 2,958,013 | 10/60 | Ansley | 317—101 |
| 3,011,105 | 11/61 | LeBlanc | 317—100 |
| 3,029,368 | 4/62 | Wulc | 317—101 |
| 3,037,265 | 6/62 | Kollmeir | 29—155.5 |
| 3,040,416 | 6/62 | Matlow | 29—155.5 |

FOREIGN PATENTS

| | | |
|---|---|---|
| 1,131,866 | 2/57 | France. |
| 144,122 | 12/30 | Switzerland. |

JOHN F. BURNS, *Primary Examiner.*

SAMUEL BERNSTEIN, *Examiner.*